(12) United States Patent
Regnier

(10) Patent No.: US 7,602,810 B2
(45) Date of Patent: Oct. 13, 2009

(54) TRANSMISSION OF GENERIC DIGITAL MESSAGES THROUGH A MICROPROCESSOR MONITORING CIRCUIT

(75) Inventor: Laurent Regnier, Gieres (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 12/166,215

(22) Filed: Jul. 1, 2008

(65) Prior Publication Data

US 2009/0006898 A1    Jan. 1, 2009

Related U.S. Application Data

(63) Continuation of application No. 10/531,510, filed on Apr. 14, 2005, now abandoned.

(51) Int. Cl.
*H04J 3/24*    (2006.01)
*H04B 7/02*    (2006.01)
*H04B 7/10*    (2006.01)

(52) U.S. Cl. ................. 370/473; 714/47; 714/E11.205; 375/267; 375/347

(58) Field of Classification Search ......... 370/465–484; 714/37, 45, 47; 375/224, 267, 347; 706/916; 717/100–129

See application file for complete search history.

(56) References Cited

U.S. PATENT DOCUMENTS

| | | | |
|---|---|---|---|
| 5,237,684 A | 8/1993 | Record et al. | |
| 5,621,663 A | 4/1997 | Skagerling | |
| 5,996,092 A | 11/1999 | Augsburg et al. | |
| 6,167,536 A | 12/2000 | Mann | |
| 6,332,117 B1 | 12/2001 | Berry et al. | |
| 6,467,083 B1 * | 10/2002 | Yamashita | 717/128 |
| 6,519,766 B1 | 2/2003 | Barritz et al. | |

FOREIGN PATENT DOCUMENTS

EP    1 184 790    3/2002

OTHER PUBLICATIONS

The Nexus 5001 Forum: "Standard For a Global Embedded Processor Debug Interface", Dec. 15, 1999, IEEE-ISTO, XP002247195.*

(Continued)

*Primary Examiner*—Afsar M. Qureshi
(74) *Attorney, Agent, or Firm*—Lisa K. Jorgenson; James H. Morris; Wolf, Greenfield & Sacks, P.C.

(57) ABSTRACT

Embodiments of the invention concern a method for transmitting digital messages through a microprocessor monitoring circuit of specific type and integrated to a microprocessor, each message including an identifier and consisting of several groups of successive and juxtaposed bits divided into segments. The method consists in successively transmitting segments associated with a first group corresponding to the identifier and comprising a fixed number of bits; with second groups, at least one of the second group comprising a fixed number of bits depending on the type of monitoring circuit, the number of other second groups being independent of the type of monitoring circuit; with a third group comprising a number of bits greater than one; and with fourth groups comprising each a number of bits greater than one, the number of fourth groups depending on the identifier and on the type of monitoring circuit.

12 Claims, 1 Drawing Sheet

| TCODE | CUSTOM | MAND_1 | MAND_2 | MAND_N | ... | CUST_1 | CUST_2 | ... | CUST_N |
|---|---|---|---|---|---|---|---|---|---|

OTHER PUBLICATIONS

International Search report from corresponding Intn'l Application No. PCT/FR02/03723, filed Oct. 29, 2002.
International Search report from related Intn'l Application No. PCT/FR02/03725, filed Oct. 29, 2002.
International Search report from related Intn'l Application No. PCT/FR02/03526, filed Oct. 15, 2002.
International Search report from related Intn'l Application No. PCT/FR02/03521, filed Oct. 15, 2002.
International Search report from related Intn'l Application No. PCT/FR02/03724, filed Oct. 29, 2002.
Plauger, D., *Real-Time Unix: Timing is Everything*, Mini Micro Systems, Cahners Publishing CY, Boston, vol. 22, No. 2, Feb. 1, 1989, pp. 72-76, XP000039292.

Okeeffe, H. et al., *Einheitliche Debug-Schnittstelle Der Zukunft Der Nexus-Standard Soll Die Kommunikation Zwischen Emulator Und Prozessor Vereinheitlichen*, Elektronik, Franzis Verlag GMBH, Munchen, vol. 49, No. 18, Sep. 5, 2000, pp. 124-128, XP001107530.
Macnamee, C., *Ein Interface Fuer Alle Nexus Als Globaler Debug-Standard*, Elektronikpraxis, Vogel, Wuerzburg, No. 3, Feb. 8, 2000, pp. 104-108, XP008001346.
Schmitt, W., *Nexus—Debug Konzept Der Zukunft? Universelle Emulations-Und Kalibrierschnittstelle Fuer Mikrocontroller*, Elektronik, Franzis Verlag GMBH, Munchen, vol. 48, No. 17, Aug. 24, 1999, pp. 52-59, XP000931028.
Nexis 5001 Forum: *Stardard for a Global Embeded Processor Debug Interface*, Dec. 15, 1999, IEEE-ISTO XP002247195.

* cited by examiner

TRANSMISSION OF GENERIC DIGITAL MESSAGES THROUGH A MICROPROCESSOR MONITORING CIRCUIT

CROSS REFERENCE TO RELATED APPLICATIONS

This is a continuation of prior application Ser. No. 10/531,510, filed Apr. 14, 2005 now abandoned, entitled "TRANSMISSION OF GENERIC DIGITAL MESSAGES THROUGH A MICROPROCESSOR MONITORING CIRCUIT, which is herein incorporated by reference in its entirety.

BACKGROUND OF THE INVENTION

1. Field of the Invention

The present invention relates to the testing of microprocessors. It more specifically relates to a method and device of digital data transmission between a test circuit integrated in a microprocessor chip and an analysis tool.

2. Discussion of the Related Art

FIG. 1 schematically shows an integrated circuit 10 comprising a microprocessor (μP) 12, an internal memory (MEM) 14, and input/output terminals (I/O) 16. Microprocessor 12 is intended to execute a program or a software stored in memory 14. Under control of the program, microprocessor 12 can process data provided by input/output terminals 16 or stored in memory 14 and provide data through input/output terminals 16.

To check the proper operation of the microprocessor, a supervision circuit 18 (TEST) is generally integrated on integrated circuit 10. Supervision circuit 18 is capable of reading specific data provided by microprocessor 12 on execution of a program, and of possibly processing the read data. Supervision terminals 22 connect supervision circuit 18 to an analysis tool 24. Analysis tool 24 may process the received signals, for example, according to commands provided by a user, and ensure a detailed analysis of the operation of microprocessor 12. In particular, analysis tool 24 may determine the program instruction sequence really executed by microprocessor 12.

The number of supervision terminals 22 for a conventional supervision circuit 18 may be on the same order of magnitude as the number of input/output terminals 16 of microprocessor 12, for example, from 200 to 400. Test terminals 22 as well as the connections of supervision circuit 18 take up a significant silicon surface area, which causes an unwanted increase in the circuit cost. For this reason, a first version of integrated circuit 10 comprising supervision circuit 18 and supervision terminals 22 is produced in small quantities to check out microprocessor 12. After this checking out, a version of integrated circuit 10 rid of supervision circuit 18 and of supervision terminals 22 is sold. This requires the forming of two versions of the integrated circuit, which requires a significant amount of work and is relatively expensive. Further, the final chip is not identical to the tested chip.

To overcome the above-mentioned disadvantages, it is desired to form a supervision circuit 18 which takes up a reduced surface area and only requires a reduced number of test terminals 22, which decreases the selfcost of supervision circuit 18. Supervision circuit 18 can then be left on the finally sold integrated circuit 10.

It is thus desired to decrease the number of signals provided by supervision circuit 18. For this purpose, certain logic operations are directly performed at the level of supervision circuit 18 on the data measured at the level of microprocessor 12 to only transmit messages having an important information content.

Thus, standard IEEE-ISTO-5001, in preparation, provides in its 1999 version, accessible, for example, on website www.ieee-isto.org/Nexus5001, a specific message exchange protocol between a supervision circuit 18 and an analysis tool 24 for a supervision circuit 18 requiring but a reduced number of test terminals 22.

Standard IEEE-ISTO-5001 provides several standardized messages, called public messages, the features of which are set once and for all and cannot be modified by the users of chip 10. Among the public messages, program tracing messages and data messages are especially distinguished. Program tracing messages provide information relative to the order of execution of the program by microprocessor 12. It may, for example, be a message indicating that a jump has occurred in the program executed by microprocessor 12. Data messages gather the other public messages that can be transmitted by supervision circuit 18 and especially provide information relative to the data processed by microprocessor 12. It may, for example, be a message indicating that a data read or write operation in an area of memory 14 has been performed by microprocessor 12.

Each public message is formed of a succession of bits distributed in several juxtaposed groups comprising a header group and secondary groups, each group coding specific data. The header group corresponds to a message type identifier. It is formed of a fixed number of bits identical for all public messages. The number of secondary groups of a given public message and the size of each of them are set by the value of the message identifier. As an example, in the case of a jump message, the secondary groups may correspond to data representative of the address of the jump destination instruction and to the number of instructions executed by microprocessor 12 since the last transmission of a jump message. In the case of a message indicating a data read or write operation, the secondary groups may correspond to the address of a register of memory 14 where the data are written or read and to the data value.

Based on the public messages, in particular, based on the program tracing messages, analysis tool 24 restores the instruction sequence executed by microprocessor 12. The restored instruction sequence can then be compared with an instruction sequence theoretically executed by microprocessor 12 to determine malfunctions of microprocessor 12.

Standard IEEE-ISTO-5001 also provides the possibility for the users to define specific messages that can be transmitted by supervision circuit 18 in addition to the public messages. A specific message is intended to be used when none of the public messages provided by the standard enables performing a function desired by the user. A specific message comprises, like a public message, a first group of header bits corresponding to an identifier of the specific message. The arrangement of the other bits of the specific message follows no particular rule and may considerably vary from one user to another. Further, analysis tool 24 connected to supervision circuit 18 must comprise processing means adapted to the processing of the specific messages.

In practice, each user wants supervision circuit 18 to transmit specific information which especially depend on the architecture which has been defined for microprocessor 12. The user then tends to privilege the use of specific messages over public messages to exactly transmit the wanted information. This decreases the advantage of standard IEEE-ISTO-5001 since, in practice, most of the messages transmitted by supervision circuit 18 are not public messages. In this case, it is very difficult to provide analysis tools 24 that can be used in interchangeable manner by supervision circuits 18 designed by different users and that implement different specific messages.

SUMMARY OF THE INVENTION

The present invention provides transmission of adaptable messages, the provision of which complies with determined rules to be able to easily implement new functions without requiring definition of specific messages and to enable use of more standardized analysis tools.

An advantage of the present invention is that it uses messages having a structure compatible with that of the public messages already provided by standard IEEE-ISTO-5001, which favors the above-mentioned standardization.

To achieve this and other objects, the present invention provides a method for transmitting digital messages through output terminals of a microprocessor supervision circuit of a determined type from among several supervision circuit types integrated on a microprocessor, each message comprising a message identifier and being formed of several groups of successive juxtaposed bits, the bit groups being divided in one or several segments each comprising a determined number of bits, the method comprising of successively transmitting segments associated with the successive juxtaposed bit groups comprising a first bit group corresponding to the identifier and comprising a fixed number of bits whatever the supervision circuit type; second bit groups, at least one of the second groups comprising a fixed number of bits depending on the identifier and on the type of supervision circuit, the number of the other second groups depending on the identifier and being independent from the supervision circuit type; a third bit group comprising a number of bits greater than one and depending on the message to be transmitted; and fourth bit groups each comprising a number of bits greater than one and depending on the message to be transmitted, the number of fourth groups depending on the identifier, on the supervision circuit type, and on the message to be transmitted.

According to an embodiment of the present invention, said at least one of the second groups is juxtaposed to the first group.

According to an embodiment of the present invention, said other second groups have a number of bits which depends on the identifier and which is independent from the type of supervision circuit.

According to an embodiment of the present invention, said other second groups have a number of bits greater than one which depends on the message to be transmitted.

The present invention also provides a device of digital message transmission through output terminals of a supervision circuit, of a determined type from among several supervision circuit types, integrated with a microprocessor, each message comprising a message identifier, said device comprising means for providing groups of successive juxtaposed bits forming the message, means for dividing the bit groups in one or several segments each comprising a determined number of bits and means for successively transmitting said segments, the bit group provision means being capable of successively providing a first bit group corresponding to the identifier and comprising a fixed number of bits identical whatever the supervision circuit type, second bit groups, at least one of said second groups comprising a fixed number of bits depending on the identifier and on the type of supervision circuit, the number of the other second groups depending on the identifier and being independent from the supervision circuit type, a third bit group comprising a number of bits greater than one and depending on the message to be transmitted, and fourth bit groups each comprising a number of bits greater than one and depending on the message to be transmitted, the number of fourth groups depending on the identifier and on the determined supervision circuit type.

BRIEF DESCRIPTION OF THE DRAWINGS

The foregoing object, features, and advantages of the present invention, as well as others, will be discussed in detail in the following non-limiting description of specific embodiments in connection with the accompanying drawings, among which.

DETAILED DESCRIPTION

Figures 1, 2:
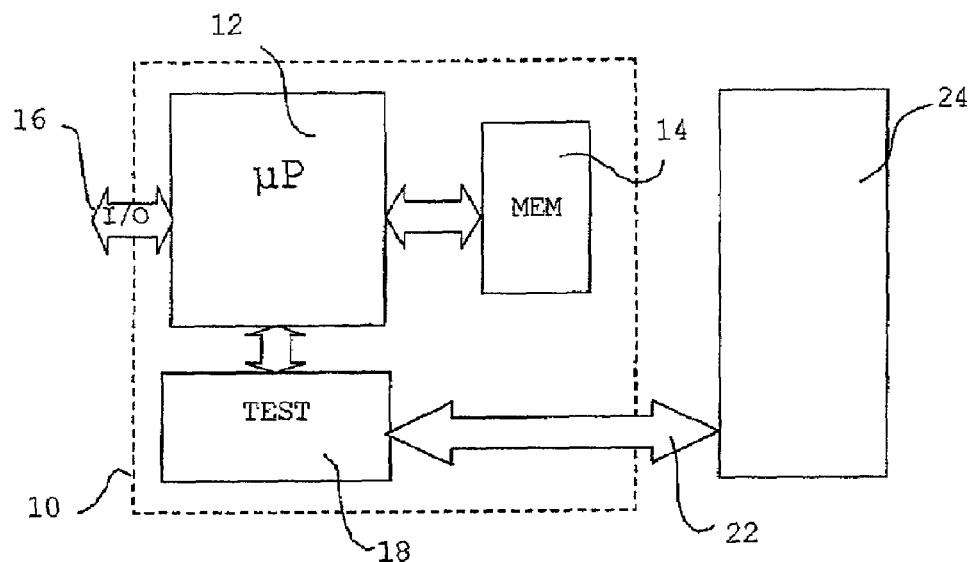
FIG. 1, previously described, very schematically shows the architecture of a chip integrating a microprocessor and a supervision circuit.
FIG. 2 shows an example of a message provided by the supervision circuit to an analysis tool according to the present invention.

The present invention provides modifying the structure of the public messages already provided by standard IEEE-ISTO-5001 to enable transmission of messages adapted to the requirements of different customers.

FIG. 2 shows a message according to the present invention. The bits are shown from the least significant bit to the left of the drawing to the most significant bit to the right of the drawing. The message bits are transmitted by supervision circuit 18 in this order. The message comprises a first group of bits TCODE corresponding to a fixed number of bits identical for all messages. The first bit group is equal to an identifier of the message. Thus, in addition to the identifiers also provided by standard IEEE-ISTO-5001, the identifier group may take different other values according to the customers' requirements. As an example, standard IEEE-ISTO-5001 provides an identifier group set to six bits. According to the present invention, the number of bits of the identifier group may be increased according to the number of messages to be provided to comply with the customers' requirements.

Identifier group TCODE is juxtaposed to a fixed customer group CUSTOM. The number of bits forming fixed customer group CUSTOM is set by the customer for each possible identifier value. Fixed customer group CUSTOM may possibly comprise no bit. Fixed customer group CUSTOM may represent any type of data that the customer wants to transmit to analysis tool 24. It may be the concatenation of different values or of data resulting from a processing performed by supervision circuit 18.

Fixed customer group CUSTOM is followed by several juxtaposed mandatory groups MAND_1 to MAND_N. The number of mandatory groups, the number of bits of each mandatory group, and the nature of the data contained in each mandatory group are determined once and for all for each identifier value. The last mandatory group MAND_N of a message according to the present invention necessarily comprises a variable number of bits, where the other mandatory groups can comprise a fixed number greater than one or a variable number of bits. A group having a variable number of bits is formed of at least one bit (possibly equal to 0).

The last mandatory group MAND_N is followed by one or several optional juxtaposed customer groups CUST_1 to CUST_N each comprising a variable number of bits. The number of optional customer groups CUST_1 to CUST_N is not defined a priori and may vary for a same identifier and for a same customer according to operating conditions of microprocessor 12.

The provided message structure according to the present invention advantageously uses the data transmission protocol between supervision circuit 18 and analysis tool 24 provided by standard IEEE-ISTO-5001.

According to such a protocol, the bits of successive groups each comprising a fixed number of bits are concatenated to form a single packet having a fixed number of bits. Similarly, the bits of a group having a fixed number of bits and the bits of a group having a variable number of bits which is juxtaposed and follows the group having a fixed number of bits may also be concatenated to form a single packet having a variable number of bits. The packets thus formed are divided into segments of n bits, where n for example ranges between 4 and 16, each segment being intended to be transmitted over an n-bit bus. When the number of bits of a packet is smaller than n, all the bits are copied in a segment and the unused most significant bits of the segment receive a predetermined value, for example, 0. When the number of bits of a packet is greater than n, the n least significant bits of the packet are copied bit to bit in a first segment, after which the next n least significant bits of the packet are copied bit to bit into a second segment, and so on until each bit of the packet has been copied. The unused most significant bits of the last segment thus formed receive a predetermined value, for example, 0. The segments are transmitted in a row over the n-bit bus at the rate of a clock signal specific to supervision circuit 18. To enable reconstructing the data packets from the segments, it is provided to transmit with each segment on the additional test terminals a transmission code which enables the analysis tool to identify data contained in the segment.

Standard IEEE-ISTO-5001 provides transmission codes to identify:

a message start segment;

an intermediary segment of a packet having a fixed or variable number of bits;

a packet end segment having a variable number of bits, when such a packet is followed by another packet of the same message;

a message end segment; and an empty segment corresponding to an idle period between messages.

The position of optional customer groups CUST_1 to CUST_N in the transmitted message advantageously uses the previously-described protocol since analysis tool 24 needs not previously know the number of optional user groups CUST_1 to CUST_N present in the message. Indeed, optional customer groups CUST_1 to CUST_N are groups having a variable number of bits placed at the end of the message. When optional customer groups are present, a specific identification code indicating an end segment of an optional customer group is thus provided by supervision circuit 18 between each optional group on transmission of optional customer groups CUST_1 to CUST_N. This enables analysis tool 24 to count the optional customer groups on reception of the message.

The present invention further enables modifying the composition of the messages to be transmitted to adapt them to the customers' requirements while enabling transmission of the public messages already provided by standard IEEE-ISTO-5001. Since the position of the groups in a message is set for all the messages according to the present invention that can be transmitted by supervision circuit 18 to analysis tool 24, it is possible to standardize as much as possible the calculation algorithms of the analysis tool for the processing of the received messages. A configuration file is transmitted to analysis tool 24 so that it is acquainted with the messages that can be transmitted by supervision circuit 18 and in particular that it is acquainted for each message with the number of bits (possibly equal to zero) forming fixed customer group CUSTOM. On reception of a message by analysis tool 24, analysis tool 24 thus knows the position of fixed customer groups CUSTOM and can thus analyze all the data present in this group. Optional customer groups CUST_1 to CUST_N being clearly identified by analysis tool 24, they can be ignored by an analysis tool 24 which would not be capable of processing them.

The nature of the data contained in fixed customer group CUSTOM may be standardized. The customers are thus offered a selection of possible configurations of the fixed customer group to standardize analysis tool 24 more. Such a group may in particular contain data which are used by analysis tool 24 for the processing of optional customer groups CUST_1 to CUST_N.

Of course, the present invention is likely to have various alterations, modifications, and improvements which will readily occur to those skilled in the art. In particular, the possibility for the users to define specific messages in addition to the messages according to the present invention may be maintained.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for transmitting digital messages through output terminals of a microprocessor supervision circuit of a determined type from among a plurality of supervision circuit types integrated with a microprocessor, each digital message comprising a message identifier and being formed of a plurality of bit groups of successive juxtaposed bits, the bit groups of successive juxtaposed bits being divided into at least one segment comprising a determined number of bits, the method comprising:

successively transmitting the at least one segment associated with the plurality of bit groups of successive juxtaposed bits, the plurality of bit groups comprising:

a first bit group corresponding to the identifier of the digital message and comprising a fixed number of bits regardless of the type of the supervision circuit;

second bit groups, wherein at least one of the second bit groups comprises a fixed number of bits depending on the identifier and on the type of supervision circuit, and a number of other second bit groups depends on the identifier and does not depend on the type of the supervision circuit;

a third bit group comprising a number of bits greater than one and depending on the digital message to be transmitted; and fourth bit groups each comprising a number of bits greater than one and depending on the digital message to be transmitted, wherein a number of the fourth bit groups depends on the identifier, on the type of the supervision circuit, and on the digital message to be transmitted.

2. The method of claim 1, wherein the at least one of the second groups is juxtaposed to the first bit group.

3. The method of claim 1, wherein each of said other second bit groups has a number of bits which depends on the identifier and which is independent from the type of the supervision circuit.

4. The method of claim 1, wherein each of said other second groups has a number of bits greater than one, the number of bits depends on the digital message to be transmitted.

5. A device for transmitting digital message through output terminals of a supervision circuit of a determined type from among several supervision circuit types integrated with a microprocessor, each digital message comprising a message identifier, said device comprising:
- means for providing groups of successive juxtaposed bits forming the digital message;
- means for dividing the bit groups in at least one segment comprising a determined number of bits; and
- means for successively transmitting the at least one segment, wherein the bit group provision means is capable of successively providing;
- a first bit group corresponding to the identifier of the digital message and comprising a fixed number of bits, the fixed number is identical regardless of the type of the supervision circuit,
- second bit groups, wherein at least one of the second bit groups comprises a number of bits set for the identifier and depending on the type of the supervision circuit, and a number of other second bit groups depends on the identifier and does not depend on the type of the supervision circuit,
- a third bit group comprising a number of bits greater than one and depending on the digital message to be transmitted, and
- fourth bit groups each comprising a number of bits greater than one and depending on the digital message to be transmitted, a number of the fourth bit groups depending on the identifier and on the type of the supervision circuit.

6. The device of claim 5, wherein the fixed number of bits of the first bit group depends on a number of digital messages to be transmitted.

7. The device of claim 5, wherein the number of bits of the at least one of the second bit groups is set by a user of the device.

8. A method for transmitting digital messages through output terminals of a supervision circuit of a determined type integrated in a microprocessor, each digital message comprising an identifier and being formed of a plurality of groups of successive juxtaposed bits, the plurality of groups being divided into at least one segment comprising a determined number of bits, the method comprising:
- defining the digital message using a data transmission protocol, wherein a position for each group in the digital message is predetermined; and
- transmitting the at least one segment associated with the plurality of groups forming the digital message, wherein the plurality of groups comprises;
- a first bit group corresponding to the identifier of the digital message and comprising a fixed number of bits that is independent of the type of the supervision circuit;
- a second bit group comprising a number of bits set for the identifier and the type of supervision circuit;
- a plurality of third bit groups, wherein a number of the third bit groups and type of data contained in each of the third bit groups is fixed for the identifier, and wherein at least one group from the plurality of third bit groups comprises a variable number of bits and is formed of at least one bit; and
- a plurality of fourth bit groups each comprising a variable number of bits greater than one and depending on the digital message to be transmitted, wherein a number of the fourth bit groups depends on the identifier, on the type of the supervision circuit, and on the digital message to be transmitted.

9. The method of claim 8, further comprising transmitting, after transmitting each of the plurality of fourth bit groups, identification code indicating an end of the fourth bit group.

10. The method of claim 8, wherein the number of bits of the at least one of the second bit groups is set by a user.

11. The method of claim 8, wherein the at least one of the second bit groups contain data that is used for processing of the plurality of fourth bit groups.

12. The method of claim 8, wherein the fixed number of bits of the first bit group depends on a number of digital messages to be transmitted.

* * * * *

UNITED STATES PATENT AND TRADEMARK OFFICE
CERTIFICATE OF CORRECTION

| | |
|---|---|
| PATENT NO. | : 7,602,810 B2 |
| APPLICATION NO. | : 12/166215 |
| DATED | : October 13, 2009 |
| INVENTOR(S) | : Laurent Regnier |

Page 1 of 1

It is certified that error appears in the above-identified patent and that said Letters Patent is hereby corrected as shown below:

On the title page, item (63) should read:
(63) Continuation of application No. 10/531,510, filed on Apr. 14, 2005, now abandoned, as a 371 of PCT/FR02/03723 filed on Oct. 29, 2002.

Signed and Sealed this

First Day of December, 2009

David J. Kappos
*Director of the United States Patent and Trademark Office*